Nov. 17, 1959    F. J. MACHOVEC    2,912,796
LAWN MOWER HOIST
Filed Feb. 17, 1958    2 Sheets-Sheet 1
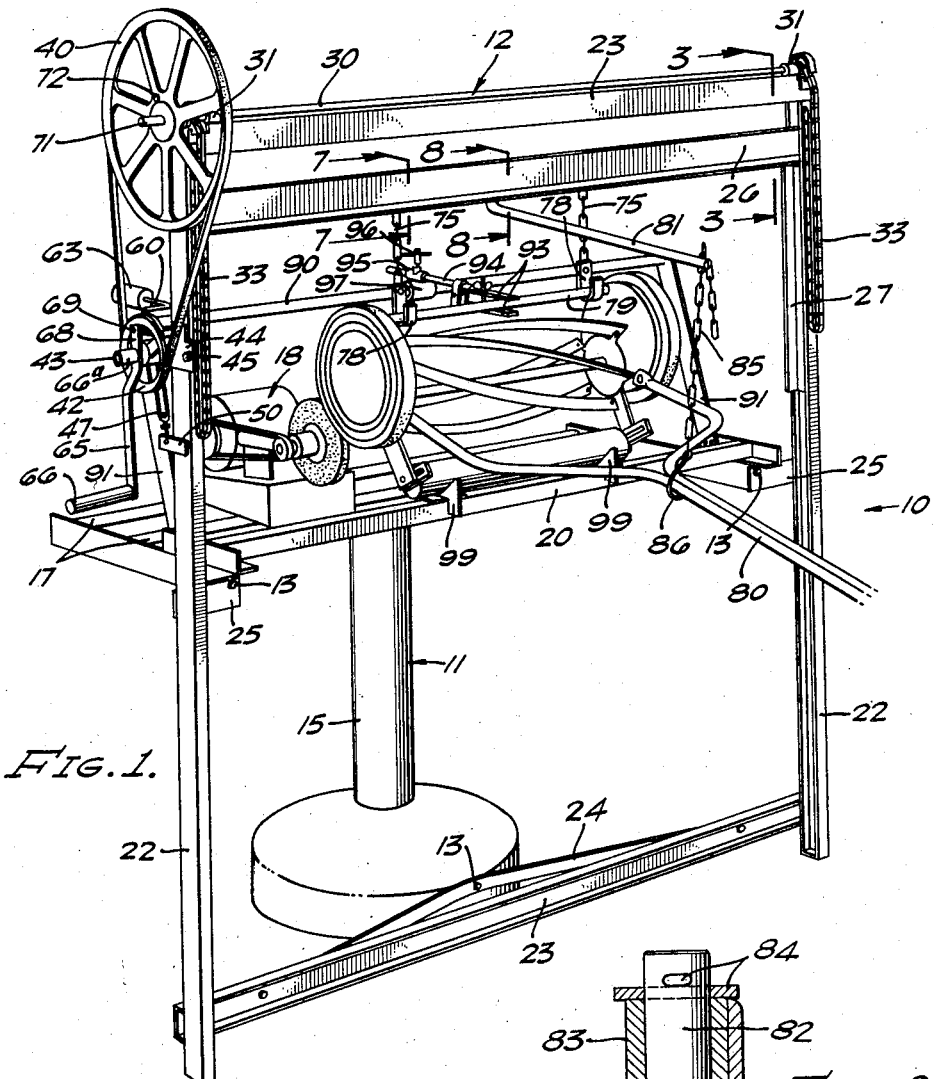
FIG. 1.
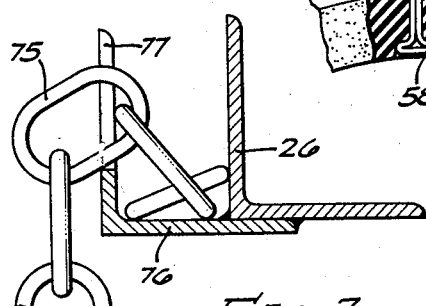
FIG. 7.
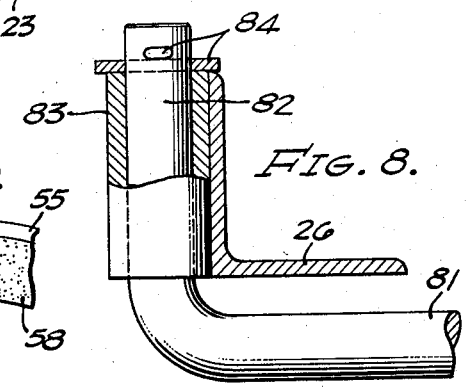
FIG. 9.
FIG. 8.
INVENTOR.
FRED J. MACHOVEC
BY
ATTORNEY Nov. 17, 1959 F. J. MACHOVEC 2,912,796
LAWN MOWER HOIST
Filed Feb. 17, 1958 2 Sheets-Sheet 2
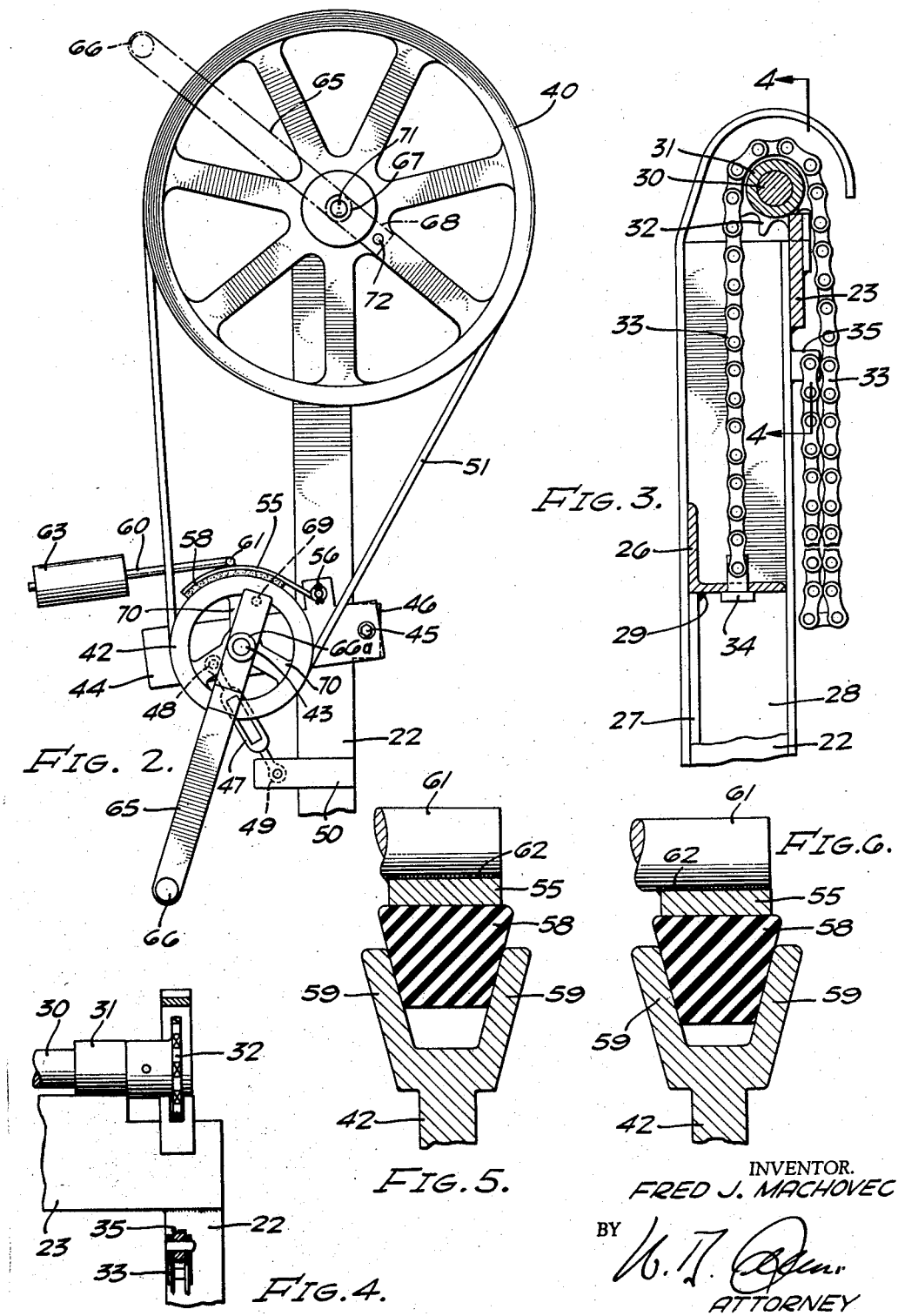
INVENTOR.
FRED J. MACHOVEC
BY 
ATTORNEY

United States Patent Office 2,912,796
Patented Nov. 17, 1959

2,912,796

LAWN MOWER HOIST

Fred J. Machovec, Pasadena, Calif.

Application February 17, 1958, Serial No. 715,552

14 Claims. (Cl. 51—48)

This invention relates to lawn mower sharpeners of the type adapted to be rigidly supported at a convenient working height for the operator and features in particular simple, inexpensive and rugged elevating means for raising and lowering the mower easily and without hazard to the operator.

In my Patent 2,466,905, granted April 12, 1949, for a Lawn Mower Sharpener, the device there shown lacks any means for raising and lowering the mower reliance being had on manpower for this purpose. If recognized safety precautions are to be observed, two operators are required to lift the mower and clamp it in the apparatus as well as to lower it to ground level after the sharpening operation has been completed. This is true of even small type hand propelled residential mowers. When large mowers are to be sharpened several operators are often needed to install and remove a mower from the sharpening apparatus. This is not only costly in labor but an operation which is hazardous to the operators and to the equipment.

According to the present invention a simple elevator assembly is provided so designed that it may be added as an accessory to sharpeners of the type shown in my aforesaid earlier patent, or included as an integral part of the sharpener as manufactured. The elevator comprises a rigid framework having a vertically movable carriage suspended from its opposite ends by suitable link chain or cable means connected to shafting with drive means featuring a simple but highly effective one way clutch assembly automatically operable to lock the carriage and a mower secured thereto in any elevated position. The clutch releases automatically if driven in a direction to elevate the load. The present invention also includes simple, readily adjustable clamping and supporting means conveniently positioned to intercept an elevated mower for sharpening and to clamp the mower rigidly in place with the reel and knife bar properly positioned for grinding by a carriage-mounted power driven grinder. Accordingly, it will be understood that the present invention provides simple, easily operated means enabling a single operator to raise and lower lawn mowers of a wide range of sizes and weights into a convenient sharpening position with safety and without hazard to the equipment or to the operator Accordingly, it is a primary object of the present invention to provide improved lawn mower sharpening apparatus featuring elevator means for raising and lowering mowers to be sharpened with ease and complete safety.

Another object of the invention is the provision of an elevator assembly adapted to be added as an accessory to existing lawn mower sharpeners or for inclusion as part of the original sharpener equipment.

Another object of the invention is the provision of simple, rugged elevator means specifically designed to raise and lower lawn mowers of a wide variety of sizes in a manner presenting the reels and knife bars thereof in proper position for grinding.

Another object of the invention is the provision of elevator means for handling lawn mowers while being sharpened and including effective automatic brake means for preventing lowering of the load elevator with an attached load except when deliberately and specially manipulated by the operator.

These and other more specific objects will appear upon reading the following specification and claims and upon considering in connection therewith the attached drawings to which they relate.

Referring now to the drawings in which a preferred embodiment of the invention is illustrated.

Figure 1 is a perspective view of the present invention taken from the back side of the normal operating position and showing a mower fully elevated to its grinding position;

Figure 2 is a fragmentary elevational view from one end of the elevator showing details of the drive for the elevator and of the one way clutch therefor;

Figure 3 is an enlarged fragmentary view taken along line 3—3 on Figure 1 showing the flexible support for the elevator carriage;

Figure 4 is a fragmentary detail view of the elevator support taken along line 4—4 on Figure 3;

Figures 5 and 6 are transverse sectional views through the one way clutch, Figure 5 showing the clutch shoe elevated out of clutching position as during clockwise rotation of the associated drive wheel while Figure 6 shows the position of the brake shoe in its fully locked position;

Figures 7 and 8 are detail cross-sectional views on an enlarged scale respectively, taken along line 7—7 and line 8—8 on Figure 1; and Figure 9 is a fragmentary view, partly in section, showing the manner of securing the brake shoe to its supporting arm.

Referring more particularly to Figure 1, there is shown a complete one-man lawn mower sharpener designated generally 10 and including as principal sub-assemblies a floor supported sharpener 11 and a mower elevator 12, the latter being rigidly but removably secured to the sharpener frame as by cap screws 13, 13. The sharpener sub-assembly 11 may be of any suitable type such as that disclosed in detail in the aforesaid Patent 2,466,905. This unit comprises a pedestal 15 supporting at its upper end a horizontally disposed framework 16 formed by a pair of parallel tubular guiderails 17 for the carriage of a power driven grinder 18. Framework 16 also includes a rigid, heavy duty, non-circular cross bar 20 for supporting the weight of the mower and for aiding in anchoring the mower rigidly in position while being sharpened.

Elevator sub-assembly 12 comprises a rigid framework formed from a pair of upright channel members 22 having rigidly secured to their upper and lower ends respectively cross channel members 23. Secured to lower cross member 23 is a V-shaped reinforcing member 24 having its mid-portion fastened to the base of pedestal 15 as by the cap screw 13. A pair of brackets 25 welded or otherwise secured to side frames 22 project toward one another and have their inner ends secured to the rear ends of the sharpener framework 16 by cap screws 13.

The elevator is provided with a vertically movable carriage formed by a heavy duty angle iron 26 having its ends extending between the webs of the facing upright frame channels 22. To prevent the opposite ends of the carriage from getting out of horizontal alignment and binding in the guideways formed by upright channels 22 there is preferably welded to either end of the carriage a short length of angle iron 27 having one web 28 lying flush with the inner side of the web of uprights 22. It will be recognized that the alignment members provided by guide irons 27 move with carriage 26 and act as end thrust bearings for the carriage.

The mode of supporting the carriage will be best understood by reference to Figures 1 and 3. A shaft 30 is rotatably supported in suitable bearings 31 fixed to the opposite ends of the upper channel member 23 inwardly of the shaft ends. Sprocket wheels 32 keyed to this shaft support heavy duty link chains 33, one end of chains being secured to carriage 26 by a connector 34 and the other end being secured to a bracket 35 welded to the elevator frame as is best shown in Figures 3 and 4. Chains 33 are sufficient for lowering carriage 26 through the full height of the elevator frame.

The drive and control mechanism for the elevator carriage and forming an important feature of the present invention is best shown in Figures 1 and 2 as including a large diameter belt pulley 40 keyed to the end of shaft 30 and a smaller diameter brake pulley 42 mounted on a stub shaft 43 supported on the outer end of arm 44. This arm is pivotally supported by pivot pin 45 positioned in a short extension bracket 46 fixed to frame channel 22. A turn buckle 47 having one end 48 secured to arm 44 and its other end 49 secured to bracket 50 on frame 22 permits arm 44 to be adjusted about pivot 45 as necessary to tension drive belt 51 supported between pulleys 40 and 42.

The one way clutch or brake found to be positively highly effective in preventing the counterclockwise rotation of pulleys 40 and 42 comprises an arcuate arm 55 having one end pivotally supported by a pivot pin fixed in bracket 44. Arm 55 is formed from a flat strip of heavy gauge metal and secured to its underside as by fasteners 58a is a brake shoe 58 having its lateral sides shaped to engage snugly the diverging side walls of brake pulley 42. To assure the proper biasing pressure of the brake shoe 58 with the side walls 59 of the pulley there is provided an L-shaped arm 60 having its shorter leg 61 welded to the arm 55 by welding 62. Adjustably supported along the longer leg of arm 60 is a weight 63 which may be provided with a releasable clamp to hold it in any desired adjusted position along its supporting arm. By moving weight 63 along the arm it is found that the effective pressure between the sides of brake shoe 58 and the side walls 59 of pulley can be varied as necessary to assure positive braking action. Owing to the shape of the brake shoe and the position of its pivot support 56, it is found that any tendency for pulley 42 to rotate counterclockwise is highly effective in pulling the brake shoe into firmer braking contacts with the walls 59. Conversely, any force applied to pulley 42 to rotate it clockwise is effective in lifting the shoe out of braking contact with walls 59 thereby providing a simple but highly effective one way clutch and brake which, because of its fully automatic action, is foolproof and safe even in the hands of an inexperienced operator.

Means here shown for driving the elevator comprises a hand crank 65 having a hand grip 66. Fixed to one side of the crank is a hollow hub 66a in registry with an opening through the crank and properly sized to slide over the projecting end of pulley shaft 43. Fixed to an extension 68 of the crank is a pin 69 adapted to extend between the pulley spokes 70 and to engage them to form a driving connection between the crank and the pulley. It will therefore be clear that the crank is effective when assembled over pulley 42 to drive the same in either direction as necessary to raise and lower elevator carriage 26.

If it is desired to drive the carriage at a higher speed, this is easily accomplished by withdrawing crank 65 from pulley shaft 43 and assembling it over the extended end 71 of shaft 30 carrying pulley 40. In this case the driving pin 69 of the crank is received by an opening 72 appropriately positioned in the hub of pulley 40.

Referring now to Figures 7, 8 and 9, there are shown other details of the invention including chains 75 which are adjustably supportable in different positions along carriage 26, such as in the manner illustrated in Figure 7. For this purpose angle iron 76 has one web welded to carriage 26 and its upright flange provided with a series of vertical notches 77 for receiving a link of chain 75 when the link is properly oriented for reception thereby. Accordingly, any one of the chain links can be anchored in slot 77 to obtain a desired chain length. The provision of a series of notches 77 along bracket iron 76 permits the chains to be adjusted crosswise of the carriage to the end that hooks 78 at the lower ends of the chains may be engageable with some rigid part of the mower frame such as with the crossbar 79.

In Figure 8 there is shown an auxiliary support 81 useful in supporting certain parts of mowers, as for example, the mower handle 80. This bracket comprises an L-shaped rod having its shorter leg 82 pivotally supported in a tube 83 welded vertically to the upright flange of elevator carriage 26, a washer and retaining key 84 serving to hold bracket 81 in assembled position. The outer end of bracket 81 is slotted to receive a link of a chain 85 having a hook 86 at its lower end for engagement about the mower handle.

A further feature of the invention is the provision of a rigidly supported bracket arm on the sharpener unit useful in clamping the upper end of a mower in a desired angular position while being sharpened. The rigid bracket referred to comprises a generally horizontal disposed circular rod 90 having its ends secured in brackets 91 the lower ends of which are rigidly anchored to framework 16. Slidable along tubular rod 90 is universally adjustable clamping means adapted to be clamped to some part of the mower frame and so constructed that the clamp along with the mower to which it is attached can be shifted toward or away from the grinder mechanism 18. This clamp comprises clamping jaws 93 mounted on the outer end of a rod 94 slidably supported within a housing 95 of a clamp 96, the latter housing being slidably carried by still another clamp 97 movable lengthwise of rod 90. Accordingly, it will be clear that the described clamping assembly is universally adjustable and operable to move a mower frame in an arcuate path extending crosswise of the rigid mower supporting rod 20. The major portion of the mower weight is preferably supported from rod 20 by means of V-shaped brackets 99 slidable along rod 20 and adapted to seat some part of the mower, as for example the mower roller, as the mower is lowered into the bracket notches by the elevator mechanism.

In the operation of the described sharpener and elevator mechanism, a mower to be sharpened is rolled along the floor to an elevating position at the rear base of the elevator 12. The elevator carriage is lowered by rotating crank 65 counterclockwise so that hooks 78 on chain 75 can be engaged under some rigid part of the mower frame, such as crossrod 79. Hook 86 of the auxiliary supporting bracket 81 is also engaged about some other part of the mower such as its handle. The operator then rotates crank 65 clockwise elevating the carriage and the attached mower. During this operation the counterweighted brake shoe automatically rises in the groove of pulley 42 to the position generally indicated in Figure 5 wherein only inconsequential resistance to the elevating operation is encountered. If at any time the operator ceases to rotate the crank clockwise, the counterweighted brake immediately settles between the walls of pulley 42 and positively locks the carriage and its load in its raised position.

After the mower has been elevated slightly above V-brackets 99 it is pushed to a position overlying the notches of these brackets and lowered into seated position therein. Clamps 93 and 95 are then adjusted and rigidly secured to crossbar 79 of the mower to present the parts to be sharpened in a proper grinding position. Once the mower has been rigidly clamped in place as described, hooks 78 may be detached.

After the grinding operation has been completed, by the use of the carriage supported grinder 18, hooks 78 are reattached to the mower and the clamps to cross frame member 79 are loosened and retracted. Crank 65 may be assembled over the larger pulley 40 in order that the mower can be speedily lowered to the floor. If the operator relaxes his grasp of the crank for any reason, brake 58, 60 functions instantly and automatically to arrest further lowering of the carriage and its attached load.

While the particular lawn mower sharpener and elevator assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In combination with a grinding and reconditioning apparatus for lawn mowers having a carriage for a power driven grinding wheel which carriage is movable longitudinally of a mower knife blade and reel assembly, that improvement which comprises a unitary elevator unit rigidly attachable vertically against one side of said reconditioning apparatus, said elevator unit having a vertical frame, an elevator carriage movable vertically of said frame for raising and lowering a mower into and out of grinding position relative to said carriage-supported grinding wheel, means for supporting a mower on said vertically movable carriage, rotatable means operable to raise and lower said elevator carriage depending upon the direction of rotation of said rotatable means, and readily releasable automatic brake means operable to lock said carriage means and a mower mounted thereon instantly in any elevated position as the elevating force is discontinued.

2. The combination defined in claim 1 characterized in that said elevator carriage includes flexibly supported hook means adapted to engage readily accessible portions of a mower frame for elevating the mower into grinding relation to said grinding wheel, and means supported from a vertically movable rigid frame for releasably supporting the handle of a mower as it is being raised and lowered by said elevator.

3. The combination defined in claim 1 characterized in that said rotatable means includes a pair of belt-connected pulleys of different diameters and crank means selectively supportable by either of said pulleys for driving the same in either direction.

4. The combination defined in claim 3 characterized in that said automatic brake means is operatively associated with the smaller diameter one of said belt pulleys and includes a brake shoe engaging a portion of said smaller pulley between the runs of the belt supported by said pair of pulleys.

5. An elevator adapted to raise and lower lawn mowers of widely different designs and sizes into grinding relation to a power-driven reconditioning apparatus for mowers, said elevator comprising a generally vertically disposed rigid frame substantially confined to a shallow vertical plane, means for securing the same detachably to and along one side of a mower reconditioning apparatus, a movable frame extending transversely of said elevator, flexible cable means having its lower end connected to said movable frame and its upper end connected with shafting rotatably supported by said rigid frame, means for detachably supporting a lawn mower on said movable frame, and manually operable means including a self-setting brake for rotating said shafting to raise and lower said movable frame and a mower supported thereon and for locking said mower securely in any desired elevated position above a floor.

6. An elevator as defined in claim 5 characterized in the provision of crank driven belt means for rotating said shafting in either direction.

7. An elevator as defined in claim 5 characterized in that said brake means includes a pulley and means connecting the same to said shafting, a brake lever arm overlying the rim of said pulley and having one end thereof pivotally supported for movement in a plane passing through and between the end faces of said pulley, brake shoe means carried by said arm and conforming to the underlying surface of said pulley, and means urging said brake shoe into firm frictional contact with said pulley to prevent rotation thereof except when said pulley is driven by the deliberate application of power thereto.

8. An elevator as defined in claim 5 characterized in that said flexible cable means comprises a pair of link chains in mesh with a pair of sprockets fixed to said shafting.

9. An elevator as defined in claim 5 characterized in that said means for detachably supporting a mower from said movable frame comprises a pair of chains adjustably engageable in slots formed in said movable frame and having hooks at their lower ends for hooking under a longitudinal frame member of a mower.

10. An elevator as defined in claim 5 characterized in the provision of an adjustable support for a mower handle while it is being elevated, said adjustable support including a rigid arm pivotally mounted on said movable frame for movement about a vertical axis, and flexible cable means carried by the outer end of said arm having hook means adjacent its free end engageable with a mower handle.

11. An elevator as defined in claim 5 characterized in that said manually operable means for driving said shafting includes a pair of belt-connected pulleys one of which is fixed to said shafting, means movably supporting the other of said pulleys for varying the tension on said belt, and said brake means being operatively associated with said movably-supported pulley.

12. In the combination of a mower grinding and reconditioning apparatus of the type having a rigid frame provided with a pair of parallel horizontally disposed trackways movably supporting a power-driven carriage-mounted grinder, that improvement which comprises a unitary elevator assembly detachably secured to said reconditioning apparatus in a vertical plane substantially parallel to said pair of trackways and including a vertically movable mower-supporting carriage, said carriage including means for rigidly supporting an assembled lawn mower in an elevated position on said frame with its knife bar and reel parallel to said trackways and in position to be ground as said grinder is moved back and forth on said trackways, means operable to elevate said carriage and a mower supported thereon into grinding position, brake means operable to lock said carriage and mower instantly in any elevated position so long as said elevating means is not being operated, and clamping means for clamping the mower in different adjusted positions for the grinding and reconditioning of the knife bar and reel by said power driven grinder.

13. A belt pulley brake assembly comprising means for rotatably supporting a belt pulley having a belt supported thereon in driving relation to a second belt pulley, means for driving one of said pulleys, a brake therefor comprising a brake lever arm overlying the groove of said first pulley between the runs of said belt and having one end thereof pivotally supported for movement of the arm toward and away from the pulley belt groove, a brake shoe secured to said arm and conforming in shape to the underlying belt groove, and weight means on the end of said arm opposite said pivot for maintaining said shoe in firm frictional contact with said belt groove.

14. The pulley assembly defined in claim 13 characterized in the provision of detachable crank means having an opening for fitting over the stub end of a shaft extending beyond one face of each of said pulleys, said crank having a pin radially offset from said opening and engageable in openings through the face of either of said pulleys whereby said crank may be employed at the user's option to drive either pulley.

References Cited in the file of this patent

UNITED STATES PATENTS

| | | |
|---|---|---|
| 674,471 | Rickards | May 21, 1901 |
| 2,657,502 | Bruffey | Nov. 3, 1953 |
| 2,696,317 | Toffolon | Dec. 7, 1954 |
| 2,780,034 | Turner | Feb. 5, 1957 |
| 2,782,566 | Rogers et al. | Feb. 26, 1957 |

FOREIGN PATENTS

| | | |
|---|---|---|
| 3,297 | Great Britain | Jan. 6, 1888 |